(No Model.)
R. L. DOW.
ENVELOPE.
No. 527,948. Patented Oct. 23, 1894.
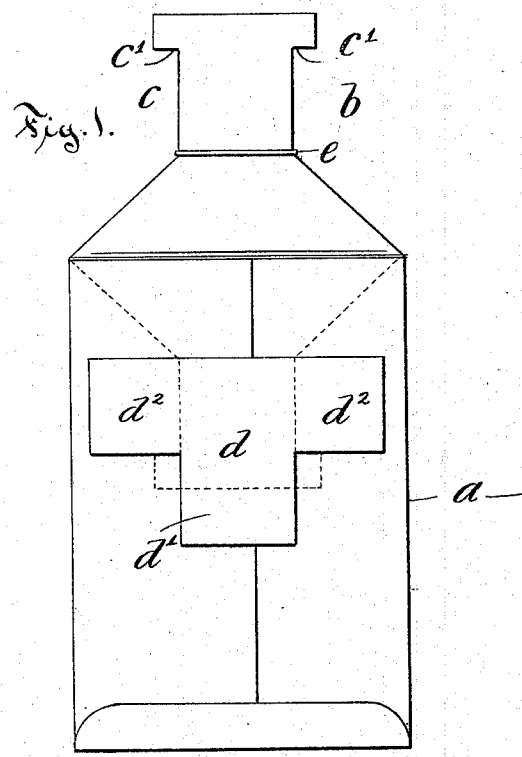
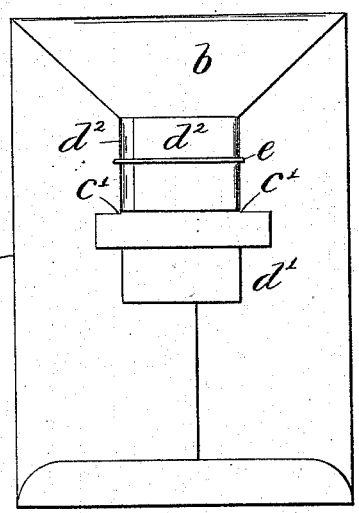
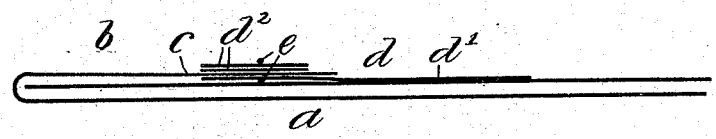
Witnesses:
Joseph Arth. Cantin
Arthur B. Jenkins
Inventor:
Riou L. Dow.
by Chas. L. Burdett,
attorney.

(No Model.)
D. A. DRAKE.
FILE CASE.
No. 527,949. Patented Oct. 23, 1894.
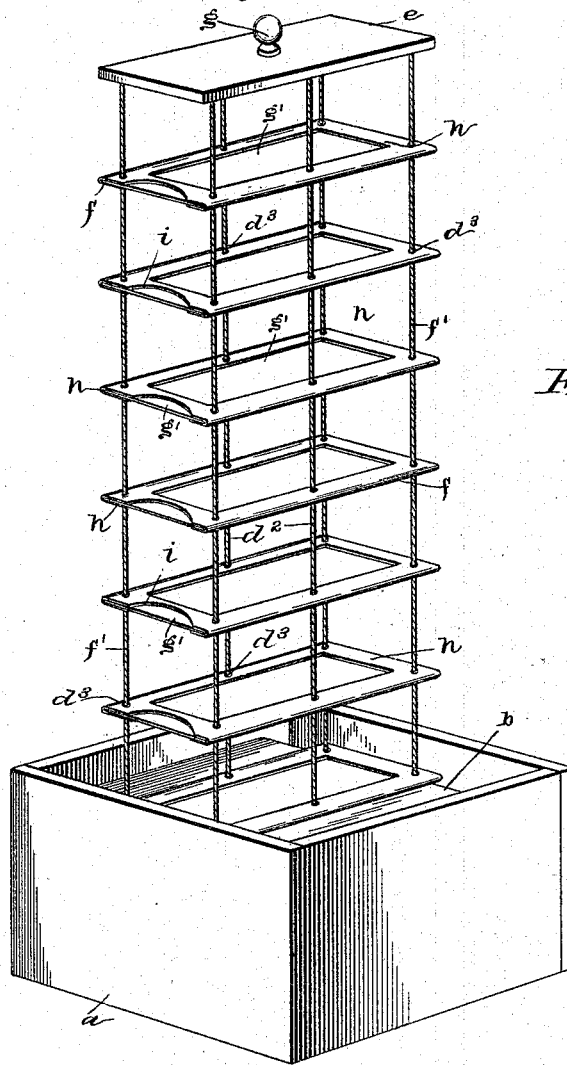
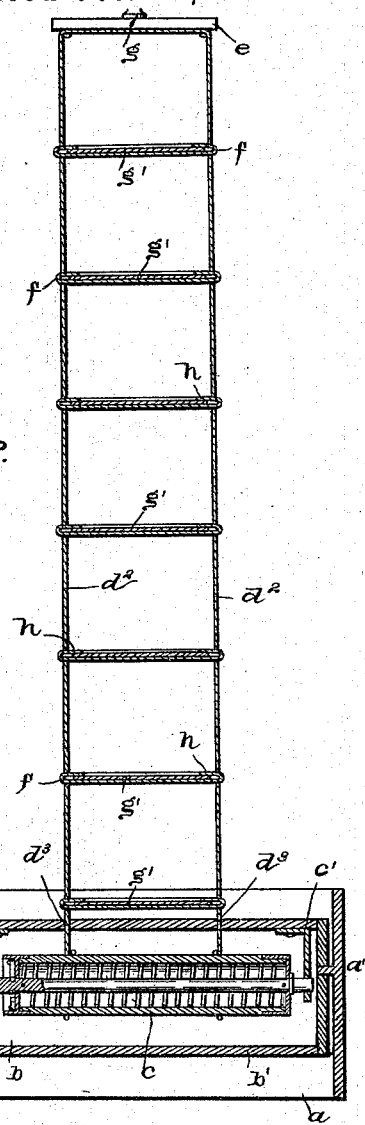
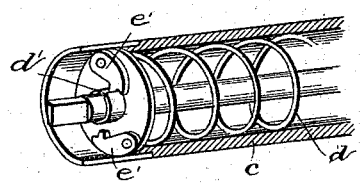
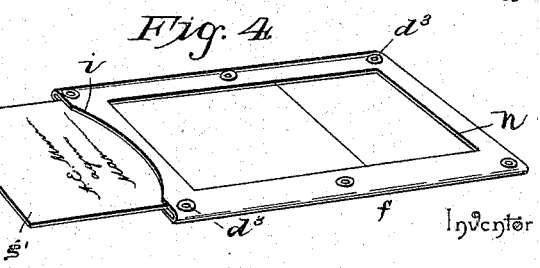
Witnesses
Chas A Ford
J. R. Owens
Inventor
David A. Drake,
By his Attorneys.
C. A. Snow & Co.